United States Patent Office 3,356,650
Patented Dec. 5, 1967

3,356,650
THERMOPLASTIC POLYURETHANES
Wilbur R. McElroy, Hillside, W. Va., assignor to Mobay Chemical Company, Pittsburgh, Pa., a corporation of Delaware
No Drawing. Filed Jan. 16, 1962, Ser. No. 166,692
7 Claims. (Cl. 260—77.5)

This invention relates to polyurethanes, that, as produced, are essentially thermoplastic products.

Polyurethane plastics including moldings, castings, caulks, sealants, adhesives and the like are obtained from reaction of an organic polyisocyanate and an active hydrogen bearing organic material and are well known. They have excellent physical properties and resistance to various chemicals. While these compounds are moderately expensive, they are used in many large scale commercial applications in view of their outstanding properties.

Such materials characteristically are considered to be thermosetting materials. It is evident that in using such polyurethanes, the thermoset characteristics place limitations, both as to time and available procedures, on forming various articles. Moreover, waste material and imperfect products cannot readily be reclaimed and therefore constitute a charge against the product being prepared.

Linear thermoplastic polyurethanes also are known. Of course, such materials are of particular interest in view of the opportunity they provide in cost cutting through reclaiming and reusing what may otherwise be waste materials.

It is the primary object of the present invention to provide polyurethane plastics that as produced are thermoplastic despite the significant cross-linking that exists in the products, and have improved properties as compared to the properties of the linear thermoplastic polyurethanes known heretofore and made with relatively similar reactants.

Another object is to provide a process for making thermoplastic polyurethane plastics in which significant cross-linking occurs as in the foregoing object.

Other objects will be apparent to the artisan from the following detailed description.

These and other objects are attained in accordance with this invention, generally speaking, by providing polyurethane plastics produced by reacting an organic polyisocyanate with a mixture of reactants comprised of at least one compound containing at least three active hydrogen containing groups and other organic compounds containing two active hydrogen containing groups, as determined by the Zerewitinoff method, the active hydrogen containing groups being reactive with an isocyanate group. In this general manner, polyurethane plastics are readily obtained that are characterized by significant cross-linking yet are thermoplastic and are further characterized by excellent light stability and generally good physical properties.

One of the essential limitations of the invention is that the mixture of the organic compounds containing the active hydrogen containing groups have an average molecular weight that is less than about 500. Subject to that limitation individual components of the mixture may have a higher molecular weight, for example up to 5000 or higher. Another critical limitation is that there be a sufficient quantity of components in that mixture having a functionality per molecule that is greater than two so that 0.01 to 20 percent of the total number of active hydrogen containing groups are provided by compounds having more than two groups per molecule. At values exceeding the foregoing limitations, the properties, such as thermoplasticity and the like, are sharply and adversely affected.

In producing products in accordance with this invention, the reactants are used in relative amounts such that the NCO/OH ratio is within the overall range of about 0.7 to 1.3. At NCO/OH ratios outside of those limits, the physical properties of the products generally are undesirable. The reactants are mixed at room temperature or at the minimum elevated temperature most convenient considering the need to pour and agitate the reactants. The mixtures of organic compounds containing active hydrogen containing groups can be premixed or added individually or all brought together at the same time. It has been found that the organic compounds containing the active hydrogen containing groups can be added to the polyisocyanate, or the polyisocyanate can be added to the organic compounds; the presence of an excess of either NCO or OH groups at any given intermediate time is not critical. The reaction is exothermic and cooling is sometimes applied to slow the reaction and to keep it within reasonable temperature limits. Frequently the nature of the product is such that it becomes very viscous during the exotherm. The fluid resin is cast and cooled to a thin layer that is manageable after completion of the reaction. The process usually is effected simply by mixing the reactants. However, the process can be carried out in a solvent such as ethyl acetate or the like.

Any suitable organic polyisocyanate may be used in the invention including aromatic, aliphatic and heterocyclic polyisocyanates. In other words, two or more isocyanate radicals may be bonded to any suitable divalent or higher polyvalent organic radical to produce the organic polyisocyanates which are useful in the present invention including acyclic, alicyclic, aromatic and heterocyclic radicals. Polyisocyanates with condensed rings such as the uretdion ring, as exemplified by 1,3-bis (4-methyl-3-isocyanato-phenyl) uretdion and the like are operable. Generally diisocyanates are used. However, triisocyanates and isocyanates of even higher functionality also can be used subject to the limitation that the sum of all the reactive groups on the tri- and higher functionality isocyanates as well as on the other reactive compounds present is not greater than about 20 mol percent of all the reactive groups, other than NCO, that are present. Suitable representative organic polyisocyanates are, therefore, ethylene diisocyanate, ethylidene diisocyanate, propylene-1,2-diisocyanate, cyclohexylene - 1,2 - diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3' - dichloro-4,4'-biphenylene diisocyanate, 1,5 - naphthalene diisocyanate, furfurylidene diisocyanate or polyisocyanates in a blocked or inactive form such as the bisphenyl carbamates of 2,4- or 2,6-toluylene diisocyanate, p,p'-diphenylmethane diisocyanate, p-phenylene diisocyanate, 1,5-naphthalene diisocyanate and the like. The preferred diisocyanates are the commercially available mixture of toluylene diisocyanates which contains by weight, 80 percent of 2,4-toluylene diisocyanate and 20 percent of 2,6-toluylene diisocyanate or 4,4-diphenylmethane diisocyanate.

Any suitable organic compound, other than polyesters, containing at least two active hydrogen containing groups as determined by the Zerewitinoff method, said groups being reactive with an isocyanate group, may be in the mixture thereof that is reacted with an organic polyisocyanate in accordance with the process of the present invention. The active hydrogen atoms are usually attached to oxygen, nitrogen or sulphur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including aromatic, aliphatic and heterocyclic diamines, triamines, tetramines and the like; polyaralkylene ethers such as propylene oxide and ethylene oxide adducts of resorcinol, hydroquinone, bisphenol A and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which containg two amino groups and one hydroxyl group and the like. Also, compounds may be used which contain one —SH group and one —OH or two —OH groups and one —SH group as well as those which contain an amino group and an —SH group and the like.

Any suitable polyhydric polyalkylene ether as well as mixtures thereof may be used such as, for example, the condensation product of an alkylene oxide or of an alkylene oxide with a polyhydric alcohol. Any suitable polyhydric alcohol may be used in producing those ethers such as, for example, ethylene glycol, 1,3-propylene glycol, 1,2-propylene glycol, 1,4-butylene glycol, 1,3-butylene glycol, 1,5-pentane diol, 1,4-pentane glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins, and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 0.5 to about 50 mols of alkylene oxide per functional group of the dihydric or higher polyhydric alcohol. The polyhydric polyalkylene ethers may be prepared by any known process such as, for example, the process disclosed by Wurtz in 1859 and in Encyclopedia of Chemical Technology, Vol. 7, pp. 257–262, published by Interscience Publishers, Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyethers with any other suitable thioether glycol. Other suitable polyhydric polythioethers are disclosed in U.S. Patents 2,862,972 and 2,900,368.

Any suitable aliphatic polyol may be used including alkane diols such as, for example, ethylene glycol, 1,3-propylene glcol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, 2,2-dimethyl1-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol, and the like; alkyne diols such as, for example, 2-butyne-1,4-diol, 1,5-hexadiene-1,6-diol and the like; alkane triols such as, for example, 1,3,6-hexanetriol, 1,3,7-heptane triol, 1,4,8-octane triol, 1,6,12-dodecane triol and the like; alkene triols such as, 1-hexene-1,3,6-triol and the like; alkyne triols such as, 2-hexyne-1,3,6-triol and the like; alkane tetrols such as, for example, 1,2,5,6-hexane tetrol and the like; alkene tetrols such as, for example 3-heptene-1,2,6,7-tetrol and the like; alkyne tetrols such as, for example, 4-octyne-1,2,7,8-tetrol and the like.

Any suitable polyacetal may be used, such as, for example, the reaction product of formaldehyde or other suitable aldehyde with a polyol such as those disclosed above.

Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like.

Any suitable aliphatic thiol including alkane thiols containing two or more —SH groups such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like, may be used.

Any suitable polyamine may be used including for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethylene triamine, triethylene tetramine, 1,3,6-hexane triamine, 1,3,5,7-heptane tetramine and the like; heterocyclic amine, polyamines such as, for example, 2,6-diamino pyridine, 2,4-diamino 5-aminomethyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, castor oil, sorbitol, triethanolamine, mannitol, N,N,N′,N′-tetrakis(2-hydroxy propyl) ethylene diamine, as well as compounds of any of the classes set forth above which are substituted with halogen such as, for example, chloro, iodo, bromo and the like; nitro; alkoxy, such as, for example methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphate and the like.

Of the foregoing organic compounds containing active hydrogen containing groups, as determined by the Zerewitinoff method, propylene glycols and preferably a polypropylene glycol of a molecular weight on the order of about 400 constitutes the preferred component of the reacting mixture of organic compounds that contains two active hydrogen containing groups per molecule. To provide the active hydrogen containing groups originating in an organic compound containing more than two such groups per molecule, it is preferred to use a triol having a molecular weight on the order of about 3000 and prepared by reaction of glycerine and propylene oxide. Other suitable and representative triols, tetrols and the like are disclosed above.

A catalyst may be used in the reaction mixture leading to the production of the cross-linked thermoplastic polyurethanes. Suitable catalysts are, for example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are for example, tin compounds such as, stannous chloride, tin salts of carboxylic acids, such as dibutyl tin di-2-ethyl hexoate, stannous octoate, tin alcoholates such as dibutyl tin dibutoxide as well as other organo metallic compounds such as are disclosed in U.S. Patent 2,846,408 and in copending application Ser. No. 835,450. If desired for any purpose, a conventional reaction regulator such as water, a triol, urea, substituted urea, amines or the like can also be used in the normal manner.

Thermoplastic polyurethanes prepared by the present invention are of particular interest for extruding and molding purposes. However, they can also be used in lacquers, as adhesives and for coatings and other purposes. In many such practices, they would be combined in an inert solvent such as, for example, xylene, ethyl acetate, toluene, ethylene glycol monoethylether acetate and the like. The resulting compositions can be applied in any suitable fashion as by dipping, brushing, roller coating and spraying onto a substrate. Any suitable substrate may be coated with the coating compositions of the invention such as, for example, wood, paper, porous plastics, such as, for example, sponge rubber, cellular polyurethane plastics, foamed polystyrene and the like as well as metals such as steel, aluminum, copper and the like. The coating composition need not contain a solvent for all applications. The coating and other compositions prepared as in this invention may contain any suitable pigment such as, for example, iron oxide, carbon black, titanium dioxide, zinc oxide, chrome green, lithol red and the like, as well as the usual fillers such as carbon black, sawdust or the like, if desired.

This invention will be described further by way of the following specific examples in which the details are given by way of illustration and not by way of limitation. In these examples, as well as elsewhere in the specification, all parts and percentages are by weight unless otherwise stated or apparent.

The following is a listing of preferred reactants, many of which are used in the examples, with short-hand designations for each.

A is a polypropylene glycol having a molecular weight of about 2000.

B is dipropylene glycol.

C is dipropylene glycol containing 0.03 percent of di-tertiarybutyl cresol.

D is a triol having a molecular weight of about 3000 prepared by reaction of glycerine and propylene oxide.

E is triol D but also contains 0.03 percent of di-tertiarybutyl cresol.

F is trimethylolpropane.

G is a diisocyanate mixture containing 80 weight percent of 2,4-toluylene diisocyanate and the remainder 2,6-toluylene diisocyanate.

H is the bis beta-hydroxy ethyl ether of hydroquinone.

I is 4,4'-diphenylmethane diisocyanate.

J is a polyol mixture containing, by weight, one part of polypropyelne glycol having a molecular weight of 425, one part of polypropylene glycol having a molecular weight of 1000, and 2.32 parts of dipropylene glycol to which 0.30 weight percent of di-tertiarybutyl cresol has been added.

The procedure followed in the first eight examples involved mixing the reactants, i.e. the polyisocyanate and the mixture of organic compounds containing active hydrogen containing groups, over a period of about ½ to ¾ hour and at a temperature that ranged, in the exotherm, up to about 95° C. Thereafter, the reaction mixture was heated at about 125° to 150° C. for 1 to 1½ hours. It was then cast and cured, usually under an atmosphere of nitrogen.

The data obtained are:

| Ex. | Polyisocyanates in Mol Equiv. | Active Hydrogen Compounds in Mol Equiv. | NCO/OH | Time to Casting and Final Temp., Min./° C. | Cure, Temp./hrs. | M.P. after Cure, degrees | Molding Temp.,° C. | Tensile Strength, lbs./sq. in. | Hardness Shore D |
|---|---|---|---|---|---|---|---|---|---|
| 1 | 2.07 G | 0.1327 A, 1.900 C, 0.03 E | 1.01 | 75/130 | 75/20+110/4 | 111–125 | 270 | 2,250 | 67 |
| 2 | 1.216 G | 0.0655 A, 1.1110 C, 0.03 E | 1.01 | 75/132 | 75/20+110/4 | 122–134 | 270 | 7,075 | 67 |
| 3 | 0.6380 G | 0.0208 A, 0.5690 C, 0.03 E, 0.0133 F | 1.01 | 75/131 | 75/20+110/4 | 172–183 | 350 | 4,250 | 67 |
| 4 | 0.9330 G | 0.0430 A, 0.8460 C, 0.03 E | 1.015 | 75/130 | 75/20+110/4 | 143–160 | 285 | 3,970 | 63 |
| 5 | 1.42 G | 0.0317 A, 1.3450 C, 0.03 E | 1.01 | 75/138 | 75/25+130/2 | 138–149 | 320 | 5,530 | 83 |
| 6 | 1.067 G | 0.01 A, 0.99 C, 0.045 E | 1.02 | 75/133 | 75/64 | 186–194 | 350 | 4,730 | 80 |
| 7 | 1.080 G | 0.01 A, 1.025 C, 0.045 E | 1.00 | 75/136 | 110/18 | 162–180 | 320 | 4,400 | 77 |
| 8 | 4.20 G | 4.00 J, 0.04 E, 0.08 F | 1.02 | 60/145 | 110/18 | 178–192 | | 7,500 | 83 |

Other examples of the invention are as follows:

*Example IX*

To 55.5 parts by weight of a diisocyanate mixture composed of 80 percent 2,4-toluylene diisocyanate and the remainder 2,6-toluylene diisocyanate was added a polyol mixture, dried by azeotropic distillation with benzene, comprised of 20 parts by weight of polypropylene glycol having a molecular weight of 2025, 38.7 parts by weight of dipropylene glycol, 28.8 parts by weight of a triol having a molecular weight of about 3000 and prepared by reaction of glycerine and propylene glycol, 0.026 part by weight of di-tertiarybutyl cresol and 0.575 part by weight of trimethylolpropane. The NCO/OH=1.01, based on the equivalent weight of the polyol mixture as determined by its OH number. The temperature was controlled at about 90° C. during the addition which required 40 minutes. The temperature was then raised to about 130° C. in an additional 35 minutes, and the hot melt was cast into trays. It was heated in a dry nitrogen atmospher for 20 hours at 75° C. and then 4 hours at 110° C. The resin was ground to minus 4 mesh. It had a flow point of 183° C. It was compression molded at 350° F. and 1800 p.s.i.

The molded parts had Shore D hardness of 67, tensile strength of about 4200 p.s.i., and Izod notched impact strength equal to 1.2 ft. lb./in. of notch. The molded parts were water white transparent and optically clear. This resin was swelled by solvents such as acetone, dimethylacetamide and dimethylformamide, but was not dissolved at room temperature.

*Example X*

Ninety-four parts by weight of a diisocyanate mixture of 80 percent of 2,4-toluylene diisocyanate and the remainder 2,6-toluylene diisocyanate were added, with agitation at 55° C. to 93° C. in a period of 40 minutes, to a polyol mixture consisting of 10 parts by weight of polypropylene glycol having a molecular weight of 2025, 69.5 parts by weight of dipropylene glycol, 43.2 parts by weight of a triol having a molecular weight of about 3000 and prepared by reaction of glycerine and propyelne oxide, and 0.037 part by weight of di-tertiarybutyl cresol. The NCO/OH was 1.0, as determined by the OH number of the polyol mixture. The temperature was raised to 139° C. in an additional 27 minutes, and the mixture was cast in trays and heated an additional 65 hours at 75° C. under a dry nitrogen atmosphere. The resin had a flow point of 165° C. and was soluble in acetone and ethyl acetate. It was ground to minus 4 mesh. A lacquer was made by dissolving 25 parts by weight of the resin in a solvent consisting of 75 parts by weight of ethyl acetate and 25 parts by weight of toluene to make a solution which contained 20 percent solids. The lacquer flowed well and was applied as a coating to leather, glass and metal. The clear, water white coating had excellent abrasion resistance, flexibility and high hardness. It was fast drying. The same resin when molded into parts at 320° F. showed a tensile strength of about 4300 p.s.i., elongation of 300 percent based on its original length, and Shore D 78 hardness.

*Example XI*

A diisocyanate mixture composed of 80 percent 2,4-toluylene diisocyanate and the remainder 2,6-toluylene diisocyanate, in an amount of 365.2 parts by weight, is added in a period of 30 minutes at 70° to 83° C. to a dry mixture of polyols consisting of 102 parts by weight of polypropylene glycol having a molecular weight of 425, 102 parts by weight of a polypropylene glycol having a molecular weight of 1000, 234 parts by weight of dipropylene glycol, 38.4 parts by weight of a triol having a molecular weight of about 3000 and prepared by reacting glycerine and propylene oxide, 0.179 part by weight of di-tertiarybutyl cresol, and 3.6 parts by weight of trimethylol propane. The NCO/OH is 1.02, based on the OH number of the polyol mixture. The mixture is then heated during an additional 30 minutes to 145° C. and cast in trays and allowed to cool immediately to room temperature. The material is incompletely reacted at this stage and is a hard friable solid. It is ground to minus 4 mesh. The ground material is then heated in a dry nitrogen atmosphere at 110° C. for 18 hours to complete the reaction. The particles adhere together but can be broken apart by hand, and grinding to minus 4 mesh again is readily accomplished.

This resin, after reacting in the ground-up condition, has a flow point of about 190° C. Samples are extruded at 290° to 360° F. Parts which are compression molded at 315° F. and 4000 p.s.i., have Shore D 83 hardness, about 7500 p.s.i. tensile strength and Izod notched impact strength of 0.5 ft. lb./in. of notch. The molded parts are water white transparent and optically clear.

The products obtained in all the foregoing examples were thermoplastic. In addition, and as can be observed from the data presented, all products were characterized by very good physical properties. Furthermore, these products were light stable as indicated by subjecting them to ultra-violet light for about one hour. That is particularly surprising for there is no explanation to which this unique result can be assigned.

The foregoing examples are merely representative of a large number of embodiments of the invention that have been practiced. These examples demonstrate the preparation of thermoplastic polyurethanes that range from soft resins melting at moderately elevated temperatures to hard resins having high melting temperature ranges. The examples set forth demonstrate variations in processing techniques, types of materials used and the like. By way of illustration, Example 8 represents the addition of a polyisocyanate to the mixture of active hydrogen containing compounds while the procedure in many of the other examples was just the reverse. Example 11 represents the unique processing technique that I have devised for use with products that become too viscous to pour or too hard to grind when fully reacted.

Cross-linking was determined for all of the examples and it was found that the urethan density of the products, in links per 10,000 grams, was within the range of 40 to 60. This significant cross-linking was confirmed by the characteristic swelling in such solvents as acetone, dimethylacetamide and dimethylformamide.

From the foregoing discussion and description, it is evident that this invention constitutes an important advance in thermoplastic polyurethane plastics of unusual and very advantageous properties, such as high hardness, heat distortion resistance, optical clarity and light stability. The latter property is wholly contrary to the expected result of discoloration.

In accordance with the provisions of the patent statutes, I have explained the principle of my invention and have described what I now believe to represent its best embodiment. However, it should be understood that, within the spirit and scope of the appended claims, the invention can be practiced otherwise than as specifically described.

What is claimed is:

1. A thermoplastic polyurethane prepared by reacting (1) an organic polyisocyanate with (2) a mixture of organic compounds substantially free of ester groups, one of said compounds having only two and the remaining compounds having at least three active hydrogen containing groups per molecule as determined by the Zerewitinoff method, wherein said remaining compounds having at least three active hydrogen containing groups per molecule provide about 0.01 to about 20 mol percent of the total number of active hydrogen containing groups in said mixture (2), the average molecular weight of said mixture (2) being less than 500.

2. A thermoplastic polyurethane in accordance with claim 1 in which the reactants are used in amounts to provide an overall NCO to OH ratio within the range of about 0.7:1.0 to 1.3:1.0.

3. A thermoplastic polyurethan in accordance with claim 1 in which said reaction is carried out in a solvent.

4. A thermoplastic polyurethane in accordance with claim 1 in which said mixture of organic compounds containing at least two active hydrogen containing groups per molecule comprises dipropylene glycol.

5. A thermoplastic polyurethane in accordance with claim 1 in which said mixture of organic compounds containing at least two active hydrogen containing groups per molecule comprises polypropylene ether glycol.

6. A thermoplastic polyurethane in accordance with claim 1 in which said compound having more than two active hydrogen containing groups per molecule comprises poly(oxypropylene)triol.

7. A thermoplastic polyurethane in accordance with claim 1 in which said organic polyisocyanate comprises toluylene diisocyanate.

(References on following page)

References Cited

UNITED STATES PATENTS

| | | | |
|---|---|---|---|
| 3,098,658 | 7/1963 | Murphy | 273—230 |
| 2,929,800 | 3/1960 | Hill | 260—77.5 |
| 3,042,631 | 7/1962 | Strandskov | 260—2.5 |
| 3,164,572 | 1/1965 | Axelrood | 260—77.5 |
| 3,061,557 | 10/1962 | Hostettler et al. | 260—77.5 |
| 3,050,482 | 8/1962 | Cobb et al. | 260—77.5 |
| 3,058,955 | 10/1962 | Newmann | 260—77.5 |
| 3,012,993 | 12/1961 | Rogan | 260—77.5 |
| 3,011,997 | 12/1961 | DeWitt et al. | 260—77.5 |
| 3,216,973 | 11/1965 | Britain | 260—77.5 |

FOREIGN PATENTS

| | | |
|---|---|---|
| 625,891 | 8/1961 | Canada. |
| 777,145 | 6/1957 | Great Britain. |

OTHER REFERENCES

Schmidt et al., "Principles of High-Polymer Theory and Practice," 1948, pp. 235–237 relied on.

DONALD E. CZAJA, *Primary Examiner.*

LEON J. BERCOVITZ, *Examiner.*

M. C. JACOBS, F. McKELVEY, *Assistant Examiners.*